Jan. 14, 1947. W. B. M. CLARK 2,414,190
CIRCUIT ARRANGEMENT FOR RATIO METERS
Filed Jan. 22, 1944

Inventor
WINSLOW B. M. CLARK
By Henry Lanahan
Attorney

Patented Jan. 14, 1947

2,414,190

UNITED STATES PATENT OFFICE 2,414,190

CIRCUIT ARRANGEMENT FOR RATIO METERS

Winslow B. M. Clark, West Orange, N. J., assignor to Thomas A. Edison, Incorporated, West Orange, N. J., a corporation of New Jersey Application January 22, 1944, Serial No. 519,373

4 Claims. (Cl. 171—95)

My invention relates to improved means and methods for effecting adjustments in circuit arrangements, especially in circuit arrangements for electrical measuring instruments, and has for a primary object to provide novel and improved means and methods for calibrating electrical measuring instruments.

My invention has particular commercial utility, and is herein illustrated and described, in terms of a circuit arrangement for ratiometer instruments. These instruments, as is well known, are arranged to measure the ratio of two currents and the circuits into which they are connected, which are typically bridge circuits, are adapted for producing changes in the ratio of two currents in response to variations in a condition to be measured. It is an object of my invention to provide a simplified and economical means and method for adjusting such circuits whereby such instruments may be readily calibrated in production.

My invention has useful application to temperature-compensated electrical measuring systems, particularly to remote indicating systems such as telemeters and ratiometer systems of the character above explained. By way of illustration, ratiometer systems are commonly used for remote temperature-indicating purposes, in which case an element variable with temperature is immersed in the medium whose temperature is to be measured and is connected into a ratiometer circuit the other elements of which are placed at a remote indicating point. Frequently, it is required that the ratiometer circuit be compensated for changes in the ambient temperature at the remote indicating point. It is another object of my invention to provide a novel and improved means and method for adjusting and calibrating such temperature-compensated circuits.

A further object of my invention is to provide an electrical measuring system incorporating an improved form of rheostat for adjusting and/or calibrating the system.

Yet further and allied objects and features of my invention are more fully pointed out in the following description and the appended claims.

In the description of my invention reference is had to the accompanying drawing, of which:

Figure 1:
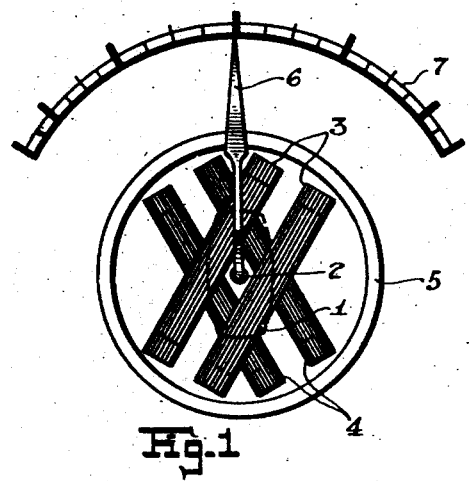
Figure 1 is an axial view of a ratiometer, largely diagrammatically shown, with which my invention is herein illustrated.

In the illustration of my invention, I show a type of ratiometer instrument, purely by way of example, such as is described and claimed in the pending application of Frederick G. Kelly, Serial No. 450,222, filed July 8, 1942 (now Patent No. 2,362,562), and having a common assignee with the present application. This ratiometer instrument comprises a permanent bar magnet 1 carried pivotally by a shaft 2 which pivots in top and bottom jewel screws 2a and 2b. The magnet has a generally symmetrical shape relative to the shaft 2 and has its magnetic axis at right angles to the shaft. Surrounding the magnet are two sets of field coils 3 and 4 of which each set consists of two serially connected coils positioned at diametrically opposite sides of the shaft 2 with their medial planes parallel to the shaft. These sets of coils are positioned at angles to each other about the shaft 2, one set of coils passing through the other. Surrounding the coils and magnet is a cylindrical shield cup 5 held in concentric relation to the shaft 2. The shield cup is preferably made of a highly permeable and non-permanent magnetic material such as that known commercially as "Mumetal" or "Permalloy," and the magnet is preferably made of a permanent and highly efficient material such as one of the socalled "Alnicos." In response to changes in the relative current energization of the coil sets, the magnet will deflect to different positions according to the ratio of the currents in the coil sets, and the positions of the magnet will be indicated by readings of a pointer 6 carried by the shaft 2 relative to a scale 7 provided on a dial 8.

More particularly, the operation of the ratiometer is as follows: Upon considering the magnetic axis of the magnet to correspond to its central longitudinal axis, it will be understood that upon passing a current through only the coil set 3 (the two coils of the set being of course polarized in the same direction) the magnet will assume a position wherein its magnetic axis is aligned with the axis of that coil set, and upon proper relative polarization of the coils and magnet the pointer will register with the low end of the scale 7. Similarly, upon passing a current through only the coil set 4, and in the proper direction, the magnet will assume a position wherein the pointer 6 will register with the high end of the scale. When current is passed through both coil sets, in proper relative directions as above explained, the coil sets will exert torques on the magnet in opposite directions and the magnet will assume intermediate positions wherein these torques are in balance, the pointer then reading at intermediate positions of the scale. These intermediate positions are determined by the ratio of the currents in the coil sets.

Figure 5:
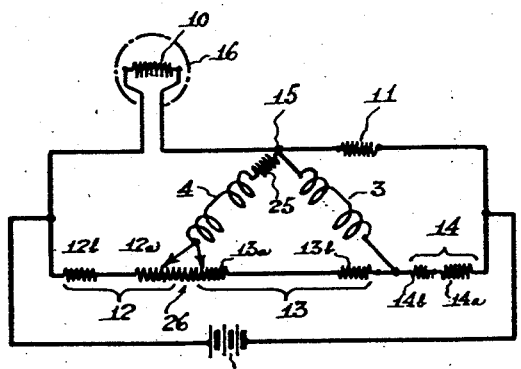
Figure 5 is a diagrammatic view of the ratiometer circuit in accordance with my invention.

For effecting changes in the ratio of the currents in the coil sets in response to changes in a condition to be measured, I preferably employ a bridge circuit such as is shown in Figure 5, this being a type of bridge circuit generally described and claimed in the Kelly application abovementioned. This bridge circuit has two branches connected in parallel across a source of direct current such as a battery 9. One branch serially includes a variable resistance 10 to be measured and a fixed resistance 11, and the other branch serially includes three fixed resistances 12, 13 and 14. The two coil sets of the ratiometer are connected from a junction 15 between resistances 10 and 11 of one branch to the respective extremities of the middle resistance 13 in the other branch.

As the resistance 10 is varied, the absolute potential of the junction point 15 is varied relative to the absolute potentials present at the extremities of the resistance 13, and so long as the potential of junction 15 is between that of the extremities of resistance 13, the voltage drop across one coil set will increase while that across the other coil set will decrease. Accordingly, for a prescribed lower value for the resistance 10, the potential of junction 15 will correspond with that of the junction between resistances 12 and 13, leaving zero voltage drop across one coil set and maximum voltage drop across the other. Similarly, for a prescribed higher value of resistance 10, the potential of junction 15 will correspond with that of the junction between resistances 13 and 14, leaving only the other coil energized; and for intermediate values of the resistance 10, currents will pass through both coils in ratios according to the values of that resistance. Thus, the pointer 5 will register with one end of the scale for one prescribed value of resistance 10 and with the other end of the scale for another prescribed value of resistance 10, and for intermediate values of that resistance the pointer will assume intermediate positions, each position of the pointer being one wherein the torques exerted by the respective coil sets on the magnet are in balance. In order, however, that the pointer will register with the low end of the scale—the left end of the scale as it appears in Figure 1—for low values of the resistance 10, and at the high end of the scale for high values of the resistance 10, the coil sets 3 and 4 are directed axially toward the low and high end portions of the scale, and the coil sets are connected respectively to the right and left extremities of resistance 13 in the bridge circuit of Figure 5. Also, for a scale length of 120° the axes of the coils are typically separated by this angle, or, in other words, the medial planes of the coils are separated by an angle of 60° as shown.

It will be understood that with proper calibration of the scale, the pointer will read directly the values of the resistance 10, and the indications will be unaffected by material changes in the voltage of the battery 9, for variations in battery voltage produce like variations in the currents of both coils without changing the ratio of those currents.

While the ratiometer system here shown is basically a resistance-measuring system, it will be understood that the resistance 10 may be varied according to variations in any condition to be measured and that the meter may be calibrated directly in terms of that condition. One such common application of the present ratiometer is as a temperature-measuring device on aircraft. In this application the resistance 10 comprises the active element of a resistor bulb 16 that is immersed in the medium whose temperature is to be measured and whose resistance varies according to that temperature, a preferred example of such bulb being that disclosed in the pending application of Frederick G. Kelly, Serial No. 493,947, filed July 8, 1943, and assigned to the assignee of the present invention.

Figure 3:
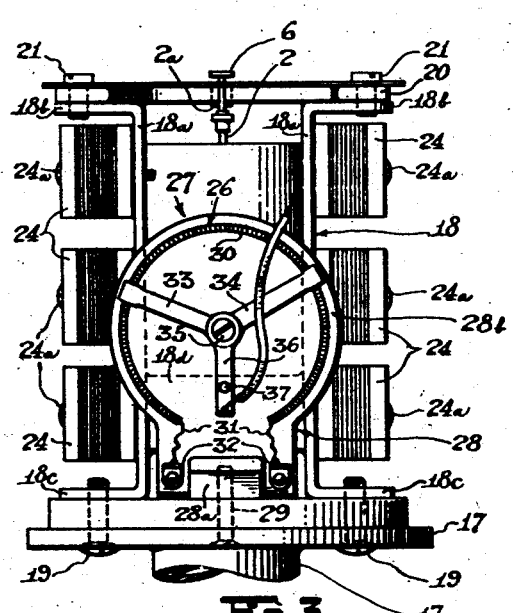
Figure 3 is another elevational view of this ratiometer assembly, taken at right angles to the line of view in Figure 2.
Figure 4:
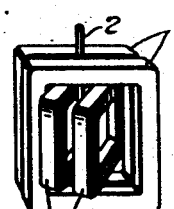
Figure 4 is a perspective view of the coil arrangement of the present ratiometer.
Figure 2:
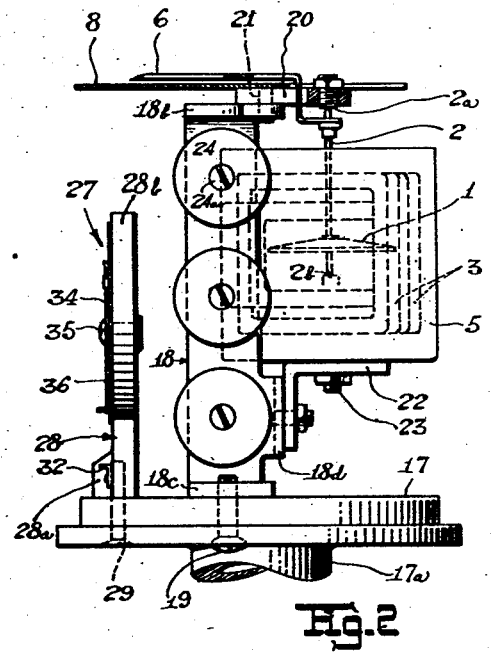
Figure 2 is an elevational view of an assembled unit comprising the ratiometer of Figure 1 and cooperating circuit elements in accordance with my invention.

In such applications the resistor bulb is located remote from the ratiometer instrument and its other associated elements, and the instrument and those other elements are provided as an assembled unit such as is shown in Figures 2 and 3. This unit comprises a case only the base 17 of which is shown. Secured to this base is an upstanding bracket 18 comprising two spaced-apart upright members 18a having top and bottom legs 18b and 18c, the members 18a being joined by a cross member 18d. The bottom legs 18c seat on the base 17 and are secured thereto by screws 19; the top legs support a cross arm 20, held thereto by screws 21, which carries the top jewel screws 2a and the dial 8; and the cross member 18d carries the ratiometer per se by way of an L-bracket 22 onto which the shield cup 5 is seated and held by a screw 23. The side members 18a of the bracket 18 serve to support the resistances of the bridge circuit of Figure 5, these resistances being respectively wound on spools 24 and held in place by screws 25. The necessary leads from the assembled unit to the resistor bulb 16 and battery 9 are led through the base 17 by way of a depending tubular portion 17a thereof and may therein be connected to respective pins of a connector plug not shown.

It will be understood that the currents which flow through the respective coil sets 3 and 4 are determined, among other things, by the resistances of the respective coils. Since these coils are preferably wound with copper wire, and copper has a substantial temperature coefficient, changes in the ambient temperature of the meter unit above described tend to produce errors in the indications of the meter. Particularly in aircraft applications the meter unit is subjected to large changes in the ambient temperature, and it is important that the unit be therefore compensated so as to be substantially free of influence by those changes. This compensation has been provided satisfactorily, in accordance with the teachings of the abovementioned Kelly application Serial No. 450,222, by making the resistances 11 and 12 wholly of a material having a negligible temperature coefficient, a predominant portion 14a of resistance 14 of such material and the remaining portion 14b of copper and comparable portions 13a and 13b of resistance 13 of such material and copper respectively. Satisfactory materials having negligible temperature coefficients for this purpose are those known commercially as "Manganin" and "Advance."

For the case where the voltage of battery 9 ranges from 11 to 14 volts, the maximum permissible current through the bulb 16 is approximately 17 ma., the resistance of the bulb is approximately 68 ohms at minus 70° C., 108 ohms at 50° C. and 152 ohms at 150° C., and the resistances of the outer and inner coil sets 3 and 4 are 290 and 230 ohms respectively (the inner coils having less resistance for the same number of turns because of their smaller mean length of turn), it has been found satisfactory to employ resistances in the bridge having average values as follows: resistance 11, 700 ohms Manganin; resistance 12, 91 ohms Manganin; resistance 14a, 615 ohms Manganin; resistance 14b, 85 ohms copper; resistance 13a, 11 ohms Manganin; and resistance 13b, 24 ohms copper.

Typically, resistor bulbs do not have a truly linear characteristic for their resistance change, in response to a given incremental temperature change, is greater at high temperatures than it is at low temperatures. The tendency of this non-linearity of the bulb is thus to expand the high end portion of the scale. It however occurs that the bridge circuit arrangement illustrated and described has itself a non-linear response characteristic which counteracts the non-linearity of the bulb and tends itself to contract the high end portion of the scale. The non-linearity of the bridge increases with increase in the range of temperature to be measured, and for temperature ranges greater than 100° it will generally over-counteract the non-linearity of the bulb to give a resultant contraction of the upper end portion of the scale. Additionally, there are the factors that the inner coils 4 have closer magnetic coupling to the magnet 1 and have less resistance than do the coils 3, the effect of which is further to accentuate the non-linearity of the bridge. To correct for these effects which tend to over-counteract the non-linearity of the bulb, and so that there may be obtained a scale symmetrical relative to its central point, there is placed a resistance 25, typically about 115 ohms, in series with the coils 4. This resistance is preferably made of copper so that the two cross arms of the bridge will each have the same temperature coefficient.

Individual calibration of each ratiometer is required because in production variations occur in the respective elements which make up the ratiometer system. It is found, however, that when resistances 11 and 14 are held within suitable tolerances, and the resistance 25 is properly selected as above explained, the calibration of each ratiometer requires only a proper adjustment of the values of resistances 12 and 13. This is because the resistance 13 controls the angular length of scale obtained in response to a given range in temperature of the resistance 10—i. e., the distance of separation of the scale divisions—and the resistance 12 controls the positioning of the temperature indications or of the scale relative to the dial 8. These calibrating adjustments have been heretofore carried out by determining with decade boxes the proper values of the resistances 12 and 13, and then taking resistance spools having an excess number of turns and removing, by trial and error, enough turns until the correct values of the resistances are obtained. Obviously, this calibrating procedure was very laborious and time-consuming, and materially increased the cost of the instruments.

By the present invention, the calibration procedure has been vastly simplified and this has been accomplished by a simple means without materially compromising the compensation of the meter unit for changes in ambient temperature. This simplification has been made possible by the observation that the variable portion of the resistance 13 may wholly comprise a material of negligible temperature coefficient—i. e., totally comprise the resistance 13a—and that, upon providing this variable portion directly adjacent the junction of resistance 13 with resistance 12, it and the variable portion of resistance 12, herein termed resistance 12a, may comprise a single and integral resistance element 26. By providing such resistance element with two movable contacts in the form of a simple rheostat, and electrically interconnecting the contacts to provide a single junction for connection with the coil set 4, then the resistances 12 and 13 may be varied independently of each other to permit a direct and easy calibration of the instrument. Also, by making the total value of the resistance element 26 at least as great as the sum of the maximum values of the variable ranges required for the resistances 12 and 13 in calibrating any one of a group of instruments, the rheostat can be standardized since one such form of rheostat can be used for calibrating each of the instruments.

In Figures 2 and 3 I show a rheostat 27 for the abovementioned purpose, comprising an insulating frame 28 made for example of Bakelite and having a base portion 28a seating on the base 17 and held thereto by a screw 29 to form a permanent part of the meter unit. The frame has a cylindrical head 28b provided with an arcuate groove 30. The resistance element 26 is wound in the form of a helix of wire having a negligible temperature coefficient, preferably of "Advance," and this helix is fitted into the groove 30 and held therein by cement. Leads 31 from the ends of the helix make connection to a pair of terminals 32 mounted on the frame 28, and to these respective terminals are connected the fixed component of resistance 12, indicated in Figure 5 as 12b, and the fixed component 13b of resistance 13. Slidably engaging the helix are two independently adjustable spring contact arms 33 and 34. These contact arms have separate apertured hub portions which overlie one another and are pivoted to the central portion of the head 28a by a screw 35. Clamped against these hub portions also by the screw 35 is a soldering lug 36 which is held against turning about the screw 35 by a rivet 37. This lug constitutes a common junction for connection in the bridge to the coil set 4.

It will be understood that the central portion of the resistance element 26 is shunted by the two contact arms and that it is only the end portions of the resistance element, beyond the respective contact arms, which are the active resistance portions comprised within the respective resistances 12 and 13. Merely by way of example, it may be noted that the total resistance of the element 26 may be 34 ohms, that in practice the range of variation for resistance 12a is from 9 to 15 ohms and that of resistance 13a from 10 to 12 ohms, and that therefore, on the average, the contact arms 33 and 34 will shunt out approximately 11 ohms of the resistance element 26. It may, moreover, be noted that while the resistances 12a and 13a have to be critically determined, the adjustment of the arms 33 and 34 is however not critical in view of the resistance element 26 being spread over a large diameter through nearly a complete circle. Moreover, while in the present invention all of the variation of resistance 13 is confined to its portion of negligible temperature coefficient, this does not have any material adverse effect on the temperature compensation of the bridge since the range of variation of that portion is only approximately 2 ohms.

I have herein shown and particularly described my invention in terms of a preferred embodiment, but it will be understood that this embodiment is subject to changes and modifications without departure from the scope of my invention, which I endeavor to express according to the following claims.

I claim:

1. In an electrical circuit system including a ratiometer, a bridge having a first branch serially including a variable resistance to be measured and a fixed resistance and a second branch serially including three fixed resistances, the middle resistance of said second branch comprising one component having a substantially neglible temperature cofficient and another component having a positive temperature coefficient and one of the fixed resistances of said second branch having a substantially neglible temperature coefficient, and a pair of coils comprised in said ratiometer and adapted to be connected from a common point in said first branch to the respective extremities of the middle resistance of said second branch: means for connecting one of said coils to one of said extremities and for varying said middle resistance and said one fixed resistance, comprising a resistance element having a substantially negligible temperature coefficient and including a portion of said one component of said middle resistance and a portion of said one fixed resistance; a pair of movable contacts associated with said resistance element; and electrical connections from said one coil to both said contacts.

2. In an electrical meter system comprising an electrical indicating instrument having a pivoted pointer and a dial, said dial bearing a scale with which said pointer cooperates: the combination of an electrical bridge including a variable element to be measured and having a branch serially including two resistances, a coil included in said instrument and connected between the branches of said bridge and having a connection to the junction between said resistances, one of said resistances controlling the range of deflection of said pointer in relation to the scale on said dial for a given range of said variable element and the other of said resistances controlling the positioning of said deflection range in relation to the scale on said dial; and a rheostat comprising a single resistance element including portions of said two resistances, and having two independently movable contacts associated with said resistance element for varying the values of said resistances respectively.

3. In an electrical measuring system including an electrical bridge having two branches connected in parallel, one of said branches including two serially-connected resistances, and an electrical indicating instrument adapted to be electrically connected across said branches to measure the unbalance of said bridge, said instrument including a coil adapted to be connected to the junction of said two resistances: a device connecting said coil to said junction, and adapted for adjusting said resistances independently of one another, comprising a unitary resistance element including at least portions of said two resistances, and a pair of electrically interconnected contacts associated with said resistance element, said contacts being connected to said coil and independently adjustable along said resistance element.

4. In an electrical measuring system comprising an electrical bridge having two branches in parallel, said bridge including a variable resistance to be measured and one of the branches of said bridge including two serially-connected control resistances, an electrical indicating instrument for measuring the unbalance of said bridge, said instrument comprising a pointer and cooperating scale, and an impedance element adapted to be connected across said bridge from the junction of said two control resistances, one of said control resistances controlling the deflection range of said pointer in response to a given range of variation of said variable resistance and the other controlling the position of said deflection range relative to said scale: a rheostat connecting said impedance element to said junction and adapted for adjusting said control resistances independently of one another, comprising two contacts associated with said control resistances respectively, each of said contacts being connected to said impedance element, and said contacts being independently adjustable relative to said respectively associated resistances.

WINSLOW B. M. CLARK.